United States Patent Office 3,070,980
Patented Jan. 1, 1963

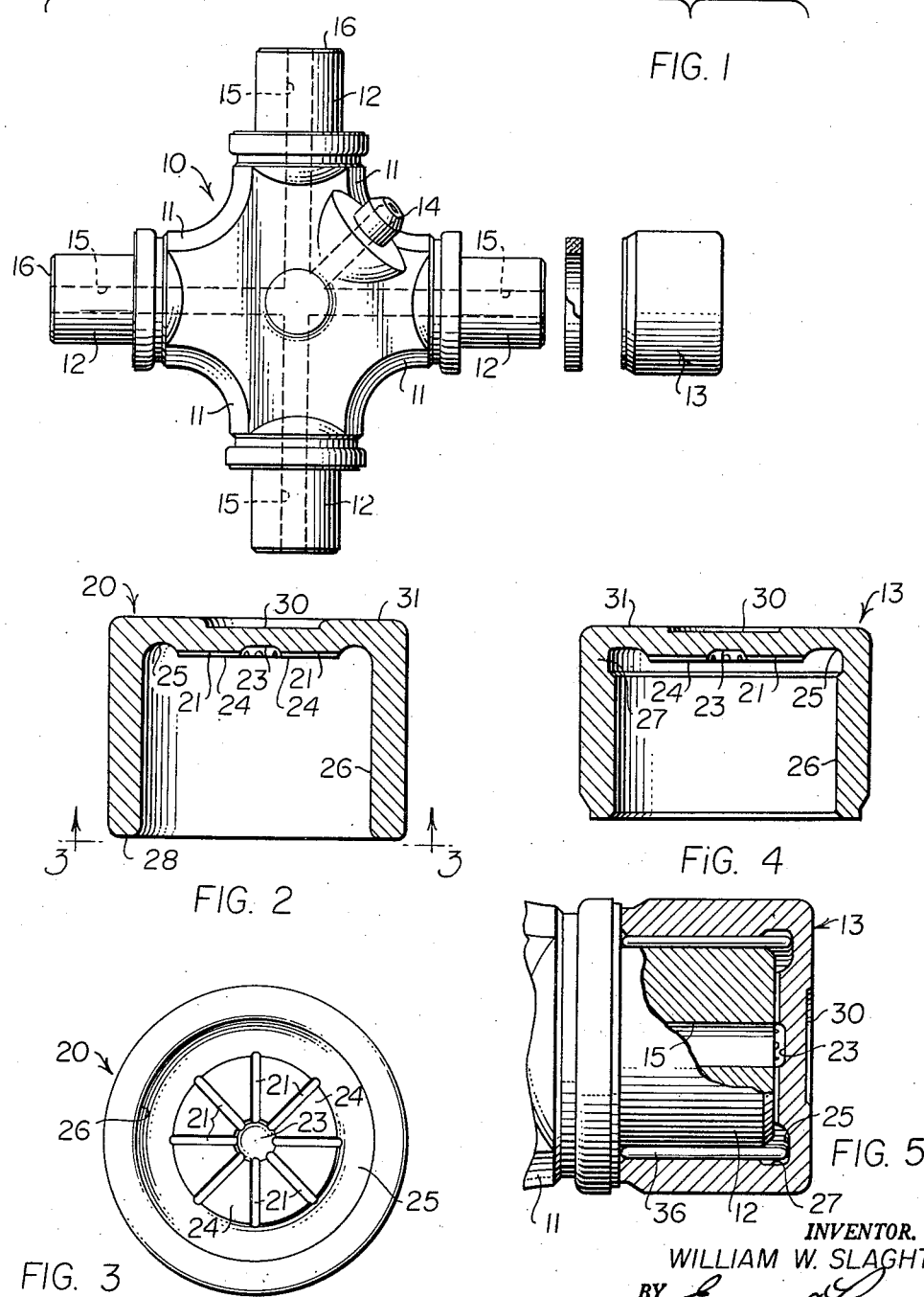

3,070,980
UNIVERSAL COUPLINGS
William W. Slaght, Fairview Park, Ohio, assignor to Cleveland Steel Products Corporation, Cleveland, Ohio, a corporation of Ohio
Filed Sept. 21, 1960, Ser. No. 57,532
8 Claims. (Cl. 64—17)

The present invention relates generally to universal couplings of the cross and yoke type wherein the trunnions of the cross or spider are journalled in bearing cups carried by the arms of the yokes. More specifically, the invention is concerned with a new and improved bearing cup construction and method of manufacture.

In universal couplings of the type referred to, the cross or spider is usually formed with grease passages extending from a grease fitting at the hub of the cross axially through the four arms of the cross and the trunnions on the ends of the arms. The outer end of each of the trunnions includes an aperture from which the lubricant can be forced into the associated bearing cup to lubricate circumferentially mounted, anti-friction rollers.

Prior to the present invention, it has been the practice to form one or more channels across the end bearing surface of the trunnion in communication with the aperture in order to facilitate the flow of lubricant radially outwardly to the bearing rollers when the bearing surfaces of the trunnion and associated bearing cup were in engagement. When a plurality of these channels were formed in each trunnion, the channels were required to be parallel, rather than being radially formed, in order that the channels in all of the trunnions could be machined in a single operation. This parallel formation of the channels, however, did not afford the optimum distribution of lubricant as could have been accomplished if the channel formation were radial. Further, the formation of the channels, regardless of the number, required a separate broaching operation that added to the cost of manufacturing the cross.

The conventional procedure for making the bearing cups also involved a plurality of separate machining operations which unduly contributed to manufacturing costs. Briefly stated, this procedure involved cutting off a length of bar stock to provide a blank of approximately the required length, and drilling the blank to produce a cup-shaped configuration. The inside end wall surface of the cup was then ground flat, and a circumferential groove was cut in this surface adjacent the juncture of the side wall. This groove was enlarged into the side wall of the cup by a trepanning operation to facilitate the grinding of the inner surface of the side wall. These machining operations were followed by grinding the outer end wall surface, the outer side wall surface, and the open end of the cup blank in order to form a finished cup having the desired length and wall thicknesses. A final polishing and finishing operation was required on the inner surface of the end wall in order to provide a proper end thrust bearing support for the trunnion.

Another significant disadvantage of the prior art bearing cups is that, when the trunnions of the cross are mounted in the cups, there is no provision for adequately lubricating the end thrust bearing surfaces of the cups. The need for such lubrication is particularly acute when the rotating drive and driven shafts are angularly related to each other, since the amplitude of oscillation of the trunnions in the cups increases with the degree of angularity of the shafts, the angles of oscillation commonly being from 5 to 10 degrees or more. Thus, the absence of adequate lubrication of the end thrust bearing surfaces of the cups may result in failure of the coupling, or, at best, unsatisfactory operation.

An object of the present invention is to provide an improved bearing cup construction which facilitates superior lubricant distribution to the bearing rollers contained therein, and which provides for an adequate supply of lubricant between the end thrust bearing surface of the cup and the end bearing surface of an associated trunnion of a cross and yoke type universal coupling.

Another object of the invention is to provide a novel method of producing bearing cups having the construction and advantages described in the preceding paragraph, which method substantially reduces manufacturing costs over conventional bearing cup forming procedures.

In accordance with the present invention, the channels which previously have been formed in the ends of the trunnions by a separate machining operation are eliminated, and, instead a multiplicity of radial grooves are formed in the end wall or thrust bearing surface of the bearing cup. These grooves radiate outwardly from a central depression in the bearing cup end wall located in axial alignment with the grease passageway through the trunnion, so that lubricant can be forced through the arms of the cross into grooves and then outwardly to the bearing rollers contained in the cup. A particular advantage of this structure is that the flow of lubricant to the bearing rollers is appreciably facilitated compared to the above described prior art, thus assuring proper flow of grease. This beneficial effect is enhanced by a better distribution of the lubricant to a multiplicity of points uniformly spaced around the circumference of the side wall of the cup, rather than merely to two diametrically opposite points as in the prior art structures.

Another important feature of a bearing cup constructed according to the invention is that the lubricant can work laterally from each of the multiplicity of grooves in the bearing cup end wall to provide adequate lubrication of the entire end thrust bearing surface of the cup.

The bearing cup itself is produced by a cold forging operation in which the radial grooves, as well as the circumferential channel at the juncture of the side and end walls of the cup, are coined in the end thrust bearing surface. By reason of this cold forging operation, the cup blank may be made close to finished size in a single operation while also incorporating the novel structural features of the invention, thereby appreciably reducing manufacturing costs by eliminating many of the diverse machining operations necessary in the manufacture of prior art structures. For example, the end thrust bearing surface of the cup, as produced by the cold forging operation, is sufficiently smooth so as not to require subsequent grinding and polishing operations which heretofore have been necessary to provide a proper bearing support for the trunnion.

Other objects and advantages of the invention will become apparent from the following detailed description and the accompanying drawing.

In the drawing:
FIGURE 1 is an exploded elevational view of a cross and an associated bearing cup formed according to the invention.
FIGURE 2 is a cross-sectional view of a bearing cup blank produced by a cold forging operation.
FIGURE 3 is an end elevation of the bearing cup blank taken along the line 3—3 of FIG. 2.
FIGURE 4 is a cross-sectional view of a finished bearing cup.
FIGURE 5 is a cross-sectional view of a finished bearing cup assembled on a trunnion.

As indicated above, the invention is primarily concerned with the construction of bearing cups for cross and yoke type universal couplings. In view of the fact that couplings of this type are well known in the art, it is believed unnecessary to set forth a detailed description of their construction other than to specify that they include a cross or spider 10 having two pair of axially aligned, equiangularly spaced arms 11 that are provided with trunnions 12 is adapted to be received in a bearing cup 13 (only one of which is shown in FIGS. 1 and 5). One pair of axially alinged bearing cups is, in turn, adapted to be mounted in the arms of a driving yoke (not shown). The other pair of axially aligned bearing cups is adapted to be similarly mounted in the arms of a driven yoke (not shown).

In order to supply lubricant under pressure to the trunnion bearings, the cross 10 is provided with a grease gun fitting 14 and passages 15 leading through the arms 11 to the outer ends or bearing surfaces 16 of the trunnions. In accordance with the present invention, these surfaces 16 of the trunnions are ground flat and do not include the conventional lubricant distributing channels common to prior art cross constructions.

The bearing cup 13 is cold forged from a solid steel slug into a cup-shaped blank 20 shown in FIG. 2. The dies for shaping the blank are suitably formed to coin a plurality of grease distributing grooves 21 and a central depression 23 in the inner end wall surface of the blank. The grooves 21 radiate outwardly from the central depression 23 and define wedge-shaped lands 24 therebetween, the lands 24 constituting end thrust bearing surfaces. Preferably, at least six of these grooves 21 are formed for optimum lubricant distribution. The inner end wall surface of the blank 20 also is formed with a circumferential channel 25 adjacent the side wall 26 of the cup. The channel 25 facilitates subsequent finishing of the inner surface of the side wall of the cup as described below and serves as a reservoir for lubricant within the finished bearing cup 13.

The configuration of the cup blank 20 preferably includes a depression 30 in the outer surface of the blank end wall. This depression defines an annular land 31 which is subjected to grinding during the finishing operations. The depression 30 reduces the surface area 31 that must be ground, and hence further reduces the cost of the finished product.

The blank 20 is machined and ground to the final shape 13 shown in FIGS. 1, 4 and 5 by first undercutting the side wall 26 in the area generally designated by reference number 27 so as to enlarge the diameter of the circumferential channel 25. The internal cylindrical surface of the side wall 26 is then ground to provide a smooth rolling surface for trunnion bearing rollers 36 in the final trunnion bearing assembly (FIG. 5). The remaining machining operations include grinding of the outer cylindrical surface of the side wall 26 and the outer annular bottom wall surface 31, and machining of the opposite, open end 28 of the cup blank so as to provide a finished cup of the proper axial length and wall thickness. During the grinding and machining operations on the ends of the bearing cup, the lands 24 of the inner end wall surface serve as a reference plane for determining the amount of stock to be removed.

As has been previously pointed out, one advantage of the cold forging operation is that grinding and polishing operations on the lands 24 of the inner end wall surface of the cup 13 are not required, since this surface will be sufficiently smooth to provide a proper end thrust bearing surface for the trunnion. Any slight imperfections which may be produced by this operation merely enhance the retention of lubricant between the end thrust bearing surfaces 24 and the flat end surface 16 of the trunnion 12.

Referring now to FIG. 5, the bearing cup 13 is shown provided with bearing rollers 36 around the inner cylindrical side wall surface and mounted on a trunnion 12 in operative position. Thus assembled, it will be seen that the opening of the passage 15 in the end of the trunnion is in axial alignment with the depression 23 in the inner end wall surface of the cup, thereby providing access for the forced flow of lubricant into the radial grooves 21. The radial formation of the grooves 21 is of particular significance since the lubricant which is forced into the cup via the central trunnion passage 15 will be supplied to a multiplicity of points around the circumferentially disposed bearing rollers 36, thus assuring optimum distribution of the lubricant.

The radial groove formation is of equal importance in that lubricant contained in the grooves can work out laterally in each direction from each groove so as to better lubricate the interposed lands 24 which serve as the actual end thrust bearing surfaces for the trunnion. This adequacy of lubrication could not be attained by the prior are constructions in which the bearing surface of the cup was imperforate and was crossed only by one or more closely spaced, parallel channels formed in the end surface of the trunnion.

It will be apparent from the foregoing description, that the novel and improved method for producing the bearing cup of the invention requires fewer and less costly machining operations than the procedure for making conventional bearing cups, and, at the same time, provides the additional feature of a multiplicity of radial lubricant grooves in the bottom of the cup while eliminating the need for machining grooves in the ends of the trunnions. As a result, the invention provides for superior lubrication of the end thrust bearing surface of the cup and for superior distribution of lubricant to the bearing rollers at a substantially reduced production cost.

Obviously many modifications and variations of the invention will be apparent to those skilled in the art in light of the above teachings. It is to be understood, therefore, that, within the scope of the appended claims, the invention may be practiced otherwise than as specifically shown and described.

What is claimed is:

1. In a bearing cup for a cross and yoke type universal coupling, said bearing cup being defined by a cylindrical side wall and an end wall with a continuous annular channel in the end wall at its juncture with the side wall, the improvement comprising a central depression formed entirely in the inner surface of said end wall and a multiplicity of grooves formed entirely in said inner surface of said end wall, said grooves communicating with and radiating outwardly from said central depression into communication with said channel and defining wedge-shaped lands between the grooves.

2. The improved bearing cup claimed in claim 1 including a substantially flat bottom, central recess formed entirely in the outer surface of said end wall and defining an annular land determining the axial length of the cup.

3. A bearing cup for a cross and yoke type universal coupling, said bearing cup being defined by a cylindrical side wall and an end wall with an annular channel formed entirely in the inner surface of said cup at the juncture of said cylindrical side wall and end wall, a central depression formed entirely in the inner surface of said end wall and spaced inwardly from said annular channel, and a multiplicity of grooves formed entirely in the inner surface of said end wall, said grooves radiating outwardly from said central depression to said channel in communication with both to provide a passageway for grease flow therebetween.

4. A forged, cup-shaped blank, said blank being defined by a cylindrical side wall and an end wall and comprising a relatively small diameter central depression formed entirely in the inner surface of said end wall, an annular channel formed entirely in the inner surface of said cup at the juncture of said cylindrical side wall and end wall, a multiplicity of substantially wedge-shaped lands defined by radiating grooves formed entirely in the inner surface of said end wall between said central depression and said annular channel in communication therewith, and a relatively large diameter central depression formed entirely in and defining a peripheral, annular land on the outer surface of said end wall.

5. In a cross and yoke type universal coupling, a cross comprising four equiangularly spaced arms, trunnions on the ends of said arms, each of said trunnions having a flat, ungrooved, end face and an axial grease passage opening at said end face; and a bearing cup mounted on each trunnion, each of said bearing cups being defined by a cylindrical side wall and an end wall and having a depression centrally formed entirely in the inner surface of said end wall, said depression being in axial alignment and in communication with the grease passage opening at the end face of the associated trunnion, an annular channel in the inner surfaces of said end wall and cylindrical side wall at the juncture of said walls, a multiplicity of grooves formed entirely in the inner surface of said end wall, said grooves being in communication with and radiating between said depression and said annular channel for conducting grease to the channel, and a multiplicity of bearing rollers disposed around the inner surface of said cylindrical side wall, said bearing rollers being disposed in rolling engagement with the sides of the associated trunnion and having corresponding ends resting in said annular channel.

6. A method of forming a bearing cup for a cross and yoke type of universal coupling comprising (a) forging a cup-shaped blank having a cylindrical side wall and an end wall with a central depression and a multiplicity of radially disposed grooves communicating therewith and formed entirely in the inner surface of said end wall for conducting grease from said depression toward the cylindrical side wall, said grooves defining a multiplicity of wedge-shaped lands therebetween, and (b) finishing opposite ends of said cup to the proper axial length and bottom wall thickness relative to said wedge-shaped lands as a reference plane.

7. A method of forming a bearing cup for a cross and yoke type universal coupling comprising the steps of (a) cold forging a cylindrical blank to form a cup having a cylindrical side wall and an end wall, and simultaneously forming central depressions entirely in the inner and outer surfaces, respectively, of said end wall, an annular channel entirely in said inner surface of said end wall at the juncture of said cylindrical side wall and end wall, and a multiplicity of grooves entirely in the inner surface of said end wall in communication with and radiating between said central depression and annular channel, whereby a peripheral annular land is provided on the outer surface of said end wall and spaced wedge-shaped lands are provided on the inner surface of said end wall, (b) undercutting said annular channel to extend into said side wall about its circumference, (c) surface finishing the interior of said side wall axially outwardly from said annular channel, and (d) finishing opposite ends of said cup to the proper axial length and bottom wall thickness relative to said wedge-shaped lands as a reference plane.

8. In the manufacture of a bearing cup for cross and yoke type universal couplings, said bearing cup being defined by a cylindrical side wall and an end wall, the improvement comprisng forming a central depression entirely in the inner surface of said end wall and a multiplicity of grooves entirely in said inner surface of said end wall, said grooves being formed in communication with said central depression and radiating outwardly therefrom toward said cylindrical side wall so as to define wedge-shaped lands therebetween, and then finishing opposite ends of said cup to proper axial length and bottom wall thickness relative to said wedge-shaped lands as a reference plane.

References Cited in the file of this patent

UNITED STATES PATENTS

| | | |
|---|---|---|
| 2,315,006 | Misch | Mar. 30, 1943 |
| 2,368,007 | Delahan et al. | Jan. 23, 1945 |
| 2,370,023 | Dunn | Feb. 20, 1945 |
| 2,384,444 | Craverner et al. | Sept. 11, 1945 |
| 2,802,351 | Anderson | Aug. 13, 1957 |

FOREIGN PATENTS

| | | |
|---|---|---|
| 792,291 | Great Britain | Mar. 26, 1958 |